(12) United States Patent
Hadley et al.

(10) Patent No.: US 9,308,982 B2
(45) Date of Patent: Apr. 12, 2016

(54) COMPOSITE JOINT PROTECTION

(75) Inventors: Paul Hadley, Bristol (GB); John Flood, Bristol (GB); Alan Quayle, Bristol (GB)

(73) Assignee: Airbus Operations Limited, Bristol (GB)

( * ) Notice: Subject to any disclaimer, the term of this patent is extended or adjusted under 35 U.S.C. 154(b) by 1292 days.

(21) Appl. No.: 12/735,761

(22) PCT Filed: Mar. 12, 2009

(86) PCT No.: PCT/GB2009/050242
§ 371 (c)(1),
(2), (4) Date: Aug. 16, 2010

(87) PCT Pub. No.: WO2009/118548
PCT Pub. Date: Oct. 1, 2009

(65) Prior Publication Data
US 2010/0308170 A1 Dec. 9, 2010

(30) Foreign Application Priority Data
Mar. 25, 2008 (GB) .................................. 0805268

(51) Int. Cl.
*B64C 3/26* (2006.01)
*B64C 1/12* (2006.01)
(Continued)

(52) U.S. Cl.
CPC ................ *B64C 1/12* (2013.01); *B29C 65/564* (2013.01); *B29C 65/76* (2013.01); *B29C 66/43441* (2013.01); *B29C 66/721* (2013.01); *B29L 2031/3076* (2013.01); *Y10T 156/10* (2015.01)

(58) Field of Classification Search
CPC .......... B32B 1/00; B29C 70/54; B29C 44/06; B29C 66/721; B29C 66/43441; B29C 1/12; B29C 33/42; B29C 66/47; B29C 66/474; B29C 35/12; B29D 99/001; B64C 1/06; B64C 1/069; B64C 1/26; B64C 3/18; B64C 3/26; B64C 3/28; B64C 1/12; B64F 5/0009

USPC .............. 244/130, 119, 120, 131, 132, 123.1, 244/129.3; 428/156, 332, 223, 614; 156/307.5, 307.7, 304.2, 304.6, 245, 156/196, 221, 222; 264/258

See application file for complete search history.

(56) References Cited

U.S. PATENT DOCUMENTS 3,607,595 A    9/1971  Windecker
4,151,031 A *  4/1979  Goad et al. ..................... 156/201
(Continued)

FOREIGN PATENT DOCUMENTS

JP    2001-192000      7/2001
WO    WO 00/09321      2/2000
WO    WO 2007/071905   6/2007

OTHER PUBLICATIONS
International Search Report for PCT/GB2009/050242, mailed Sep. 28, 2009.
(Continued)

*Primary Examiner* — Tien Dinh
*Assistant Examiner* — Vincente Rodriguez
(74) *Attorney, Agent, or Firm* — Nixon & Vanderhye P.C.

(57) ABSTRACT

The present invention relates to a joint between a laminar composite cover (12) and a second cover (15) (which may or may not be also formed from a composite material). The invention also relates to a method of manufacturing such a joint and a method of manufacturing a composite cover suitable for use in such a joint. The laminar composite cover (12) comprises a stack of layers, substantially all of the layers being shaped to form a joggle, each joggle comprising a first portion, a second portion where the layer extends substantially parallel with the first portion, and a ramp (33) between the first and second portions where the layer extends at an angle to the first and second portions, the number of layers being substantially the same on both sides of the ramp. The second cover (15) partially overlaps with the composite cover, and a clamp or fastener (31) holds the covers together where they overlap. The covers have external sides which are substantially aligned with each other so as to form a smooth aerodynamic surface.

9 Claims, 4 Drawing Sheets

(51) Int. Cl.
  *B29C 65/56* (2006.01)
  *B29C 65/76* (2006.01)
  *B29C 65/00* (2006.01)
  *B29L 31/30* (2006.01)

(56) References Cited

U.S. PATENT DOCUMENTS

| | | | |
|---|---|---|---|
| 4,668,176 A * | 5/1987 | Zeibig et al. | 425/464 |
| 4,888,451 A * | 12/1989 | Toni et al. | 174/94 R |
| 5,071,338 A * | 12/1991 | Dublinski et al. | 425/403 |
| 5,455,096 A * | 10/1995 | Toni et al. | 428/116 |
| 5,897,739 A * | 4/1999 | Forster et al. | 156/285 |
| 6,736,919 B1 * | 5/2004 | Roebroeks | 156/201 |
| 7,909,290 B2 * | 3/2011 | Cooper | 244/132 |
| 8,043,554 B2 * | 10/2011 | Yip et al. | 264/573 |
| 2005/0230551 A1 * | 10/2005 | Guinchard et al. | 244/131 |
| 2008/0029648 A1 * | 2/2008 | Giamati | 244/134 D |

OTHER PUBLICATIONS

Written Opinion of the International Searching Authority for PCT/GB2009/050242, mailed Sep. 28, 2009.
UK Search Report for GB 0805268.0 dated Jul. 15, 2008.
English translation of Japanese Office Action mailed Jul. 2, 2013 in JP 2011-501296.

* cited by examiner

COMPOSITE JOINT PROTECTION

This application is the U.S. national phase of International Application No. PCT/GB2009/050242 filed 12 Mar. 2009, which designated the U.S. and claims priority to GB Application No. 0805268.0 filed 25 Mar. 2008, the entire contents of each of which are hereby incorporated by reference.

FIELD OF THE INVENTION

The present invention relates to a joint on an aircraft between a laminar composite cover and a second cover (which may or may not be also formed from a composite material). The invention also relates to a method of manufacturing such a joint and a method of manufacturing a composite cover suitable for use in such a joint.

BACKGROUND OF THE INVENTION

Aircraft components including items such as wing skins and other covers are increasingly being made from composite materials, for example laminates. It is known to fasten the leading and trailing edge covers of a wing to the wing skin using butt-straps located along the joint between the leading and trailing edge covers and the wing skin. These butt-straps secure the covers in place and ensure that the leading and trailing edges of the covers are properly aligned with the corresponding trailing and leading edges of the wing skin.

Conventionally, a metallic butt-strap 1 is used as shown in cross-section in FIG. 1 and described in WO 2007/071905. The butt-strap is attached to the inner mould line (IML) face of the wing skin that generally faces towards the interior of the wing. Prior art butt-strap 1 has a stepped, z-shaped profile, with a short vertical portion 1a joining two horizontal plate portions 1b, c. In this example, plate 1b fits over a portion of the IML face of the aircraft's wing skin 2 such that the leading edge of skin 2 butts up against vertical portion 1a. This is bolted in place with bolt 3 that is countersunk into skin 2 on its outer-mould-line (OML) face.

Plate 1c is attached to the structure that is to be fixed to the leading edge of the cover. For example a D-nose leading edge skin 4 is shown attached to a wing cover leading edge 5 (FIG. 2). In order to reduce erosion of the composite skin 2 by airflow 6, the D-nose skin 4 is usually chosen to be sufficiently thick to overhang the leading edge 5 of skin 2. However, it is found that aerodynamic erosion still occurs and the increased thickness also increases drag. Aerodynamic erosion is often exacerbated when composite materials are used.

The prior-art butt-strap is also vulnerable to bird strike and similar collisions. FIG. 3 shows schematically how an impact on the leading-edge structure (not shown) attached by butt-strap 1 can lead to catastrophic forces on bolt 3. The present invention seeks to ameliorate at least some of the abovementioned problems.

SUMMARY OF THE INVENTION

A first aspect of the invention provides an aircraft joint comprising a laminar composite cover comprising a stack of layers, substantially all of the layers being shaped to form a joggle, each joggle comprising a first portion, a second portion where the layer extends substantially parallel with the first portion, and a ramp between the first and second portions where the layer extends at an angle to the first and second portions, the number of layers being substantially the same on both sides of the ramp; a second cover which partially overlaps with the composite cover; and a clamp or fastener which holds the covers together where they overlap, wherein the covers have external sides which are substantially aligned with each other so as to form a smooth aerodynamic surface.

A further aspect of the invention provides a method of manufacturing an aircraft joint between a composite cover and a second cover, the method comprising: providing a laminar composite cover comprising a stack of layers, substantially all of the layers being shaped to form a joggle, each joggle comprising a first portion, a second portion where the layer extends substantially parallel with the first portion, and a ramp between the first and second portions where the layer extends at an angle to the first and second portions, the number of layers being substantially the same on both sides of the ramp; partially overlapping a second cover with the composite cover; holding the covers together where they overlap with a clamp or fastener; and substantially aligning external sides of the covers with each other so as to form a smooth aerodynamic surface.

Typically a protector is provided on the external side of the composite cover which covers at least part of the ramp. The protector may be formed from a composite material, a rubber, or any other suitable material.

Typically the protector has a tapered shape which is relatively thick towards the bottom of the ramp and relatively thin towards the top of the ramp.

The second cover may comprise a leading edge or trailing edge cover of an aircraft structure such as a wing, a horizontal tail plane, a vertical tail plane, or a control surface such as an aileron or flap. In this case the composite cover is typically an upper or lower skin of a primary element such as a wing box, extending on an opposite side of a spar from the second cover.

Alternatively the second cover may comprise a manhole cover. In this case the composite cover is typically a lower skin of a wing.

The protector may be installed after the covers are overlapped, or more preferably before they are overlapped.

The protector may be attached by a layer of adhesive, by co-curing it with one of the covers, by a combination of such methods, or by any other suitable method.

Preferably the protector is pre-formed with a tapered shape before it is installed in position covering the ramp.

Preferably each ramp extends at an angle which is no steeper than 1 in 5 relative to the first and second covers. For instance each ramp may extend at an angle of 1 in 8, or 1 in 10, relative to the first and second covers.

A further aspect of the invention provides a method of manufacturing a composite cover, the method comprising: pre-forming a protector with a tapered shape; mounting the protector on a mould tool; laying a stack of layers of composite material on the protector on the mould tool whereby at least one of the layers forms a ramp; and curing the stack of layers of composite material. Typically each of the layers in the stack is formed with a ramp, typically forming the cover into a Z or joggle shape.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
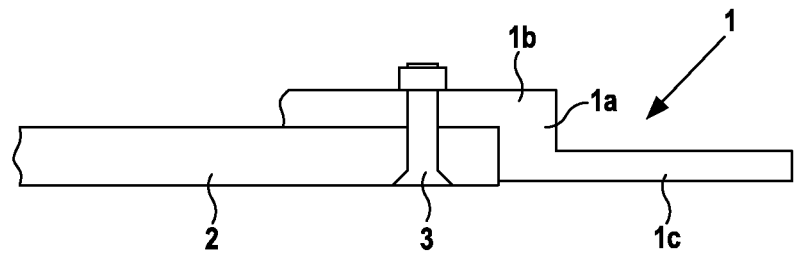
FIGS. 1-3 illustrate prior art butt-strap configurations.
Figure 2:
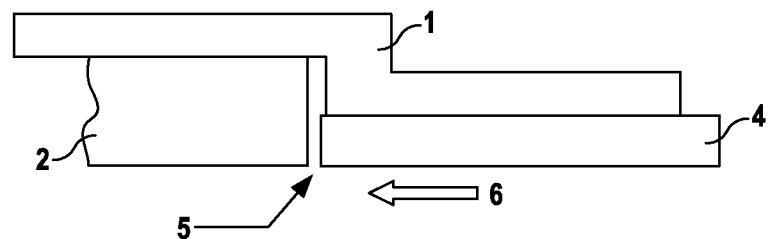
Figure 3:
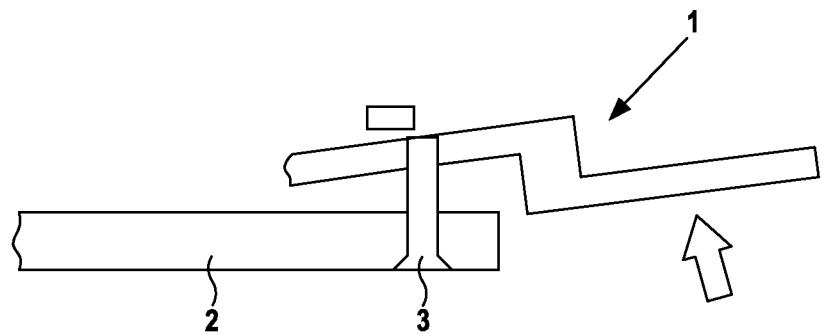
Figure 4:
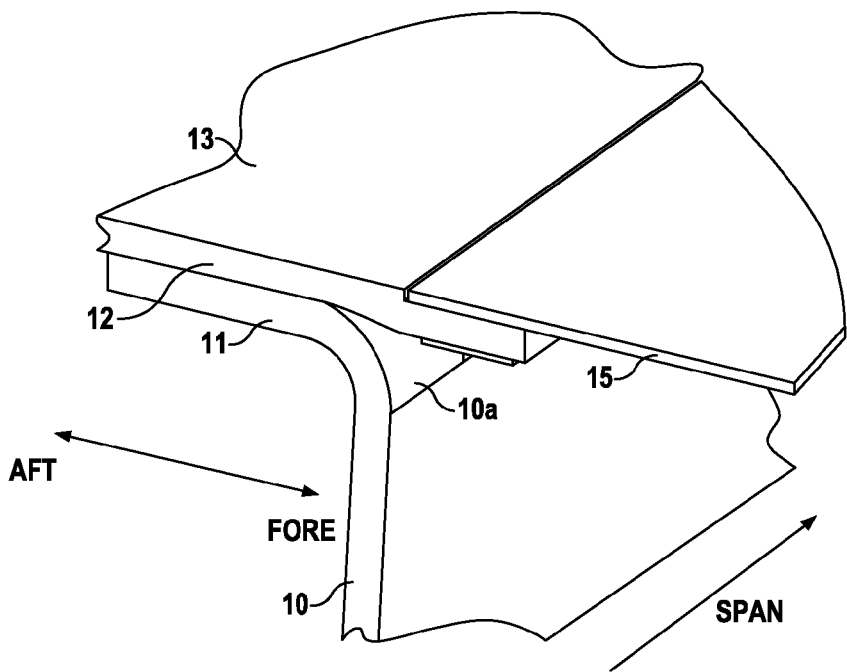
FIG. 4 is a perspective view of the front spar of an aircraft wing.

A front spar of an aircraft wing is shown in FIG. 4. The spar comprises a web 10, an upper flange 11 and a lower flange (not shown). The spar has a radius portion 10a where the web 10 meets the flange 11. A laminar composite skin 12 is attached to the upper flange 11 and extends aft of the spar to form the upper boundary of the wing box (the primary structural element of the wing). The skin 12 also overhangs the front of the spar slightly as shown in FIG. 4.

Figure 7:
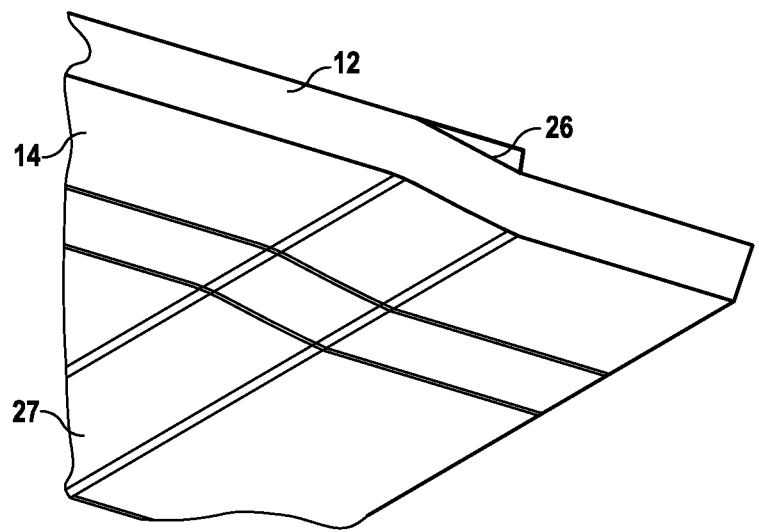
FIG. 7 shows the underside of the wing skin produced by the method illustrated in FIG. 6.

The skin 12 has an external side 13 shown in FIG. 4 and an internal side 14 shown in FIG. 7.

Figure 6:
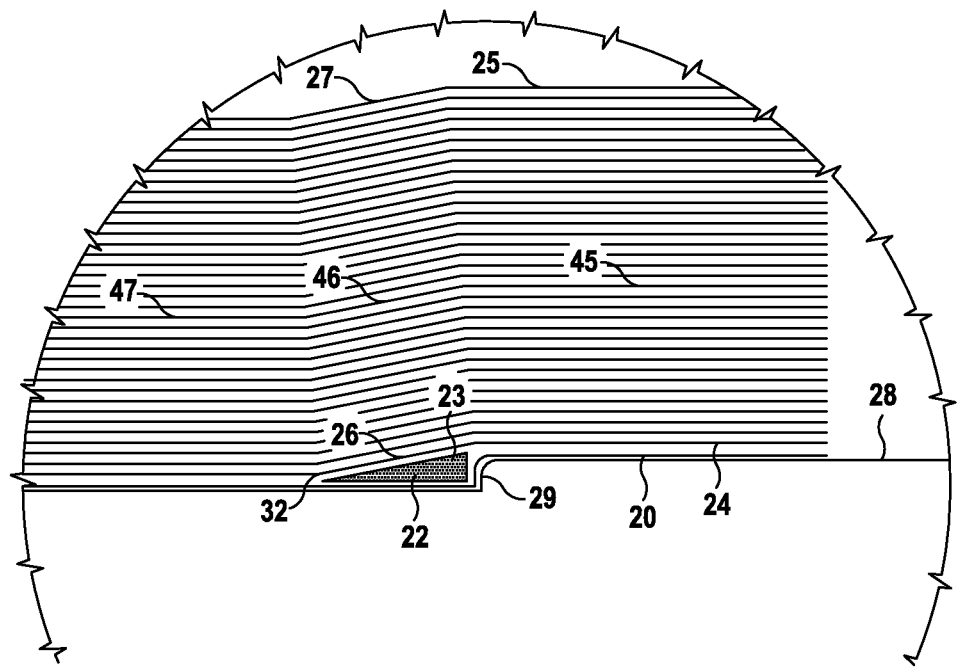
FIG. 6 illustrates a method of constructing the wing skin of FIG. 4.

The detailed structure of the skin 12 during manufacture is shown in FIG. 6. The skin 12 is formed by the following sequence of steps:

- an edge protector 22 is pre-formed with a wedge shape which tapers gradually from a relatively thick end to a relatively thin edge. The edge protector 22 may be pre-formed from a unidirectional extruded composite material; rubber; or by carbon fibres impregnated with epoxy resin and pultruded to shape. In the preferred case, the edge protector is pre-formed by a pultrusion process in which carbon fibres and epoxy resin are combined and pulled by rollers through a die with the desired cross-sectional shape. The die is heated so as to cure or partially cure the epoxy resin, so that the edge protector 22 retains its shape
- a copper film 20 is laid onto a mould surface 28 which is formed with a step 29
- the edge protector 22 is placed on the copper film 20 as shown, with its thick end contacting the step in the copper film. The angled surface 23 of the edge protector 22 is fitted with a strip of film adhesive FM 300 (not shown) either before or after it is laid onto the mould
- a first ply 24 of "prepreg" is laid onto the mould tool, adhering to the film adhesive. The ply 24 of "prepreg" comprises a unidirectional array of carbon fibre impregnated with an epoxy resin matrix.
- a stack of plies of "prepreg" material is laid onto the mould with the fibre direction varying across the stack as required, until a final ply 25 (which will form the internal surface of the skin 12) has been laid
- a vacuum bag (not shown), optionally in combination with other elements such as release films, is laid over the final ply 25
- the space between the vacuum bag and the mould is evacuated in an autoclave which is simultaneously heated to above the cure temperature of the epoxy resin so that the prepregs and edge protector 22 become fully cured
- the vacuum bag etc are removed, leaving the cured skin 12 as shown in FIG. 7.

The stack of layers forms a Z-shaped so-called "joggle" profile with a ramp above the edge protector 22. Each one of the layers in the stack is shaped to form a joggle, each joggle comprising a first portion, a second portion where the layer extends substantially parallel with the first portion, and a ramp between the first and second portions where the layer extends at an angle to the first and second portions. For example one of the internal layers of the stack comprises a first horizontal portion 45 at the "top" of a ramp 46 (top and bottom being defined in this case relative to the orientation shown in FIG. 5), and a second horizontal portion 47 at the "bottom" of the ramp 46.

Note that the ramp extends across the full stack thickness, so that the external and internal layers 24,25 are both formed with ramps 26,27 respectively along with all of the internal layers. The shape of the external side 13 of the skin (known as the "outer mould line" or OML) is precisely controlled since it engages the mould tool during the cure process.

Note that the number of layers in the stack is the same on both sides of the ramp. As a result there are no discontinued layers within the interior of the stack which would cause porosity problems.

Figure 5:
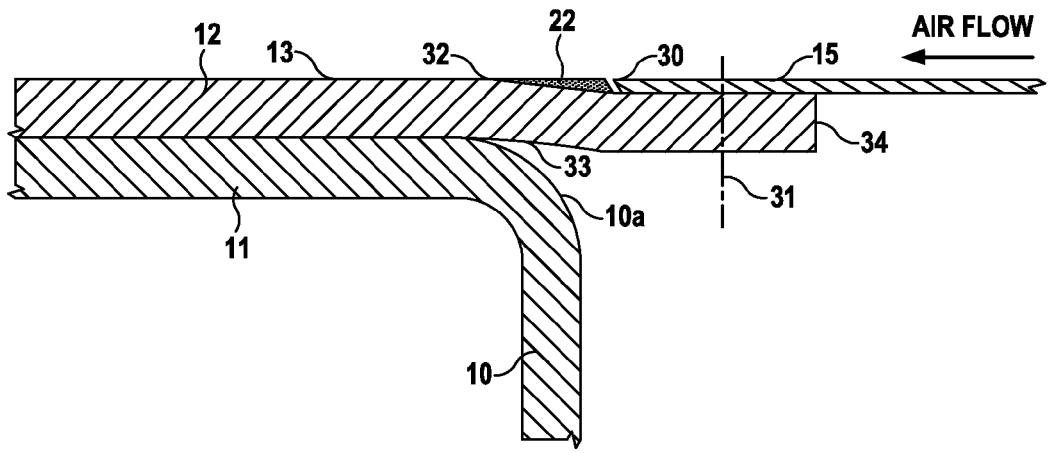
FIG. 5 is a cross-sectional side view of the joint between the wing skin and the leading-edge panel in the wing of FIG. 4.

After the skin 12 has been bolted to the spar, it is joined to a leading edge panel 15 by a lap joint shown most clearly in the cross-sectional view of FIG. 5. The panel 15 may or may not be formed from a similar composite material.

The internal side of the panel 15 is partially overlapped with the external side 13 of the skin 12 as shown in FIG. 5. The edge protector 22 and the external sides of the panel 15 and the skin 12 together form a substantially continuous external aerodynamic surface which is exposed to an airflow as shown. A fastener (such as a bolt) is then passed along a line 31 through the skin 12 and panel 15 where they overlap. The fastener can be removed to enable the joint to be disassembled for inspection or repair purposes.

The edge protector 22 is positioned between the ramp and the trailing edge 30 of the panel 15, and protects the edge 32 at the downstream top of the ramp 26 from erosion by particles carried by the airflow (which travels in the direction indicated in FIG. 5). The gap between the edge protector 22 and the trailing edge 30 of the panel 15 is filled using Aero filler (not shown) at final assembly.

On the internal side of the skin 12, the "top" 33 of the ramp is positioned as close as possible to the spar 11, so the ramp partially overlaps with the radius portion 10a of the spar (top and bottom being defined in this case relative to the orientation shown in FIG. 5). This enables the edge 34 of the skin 12 to be positioned relatively close to the spar.

Figure 8:
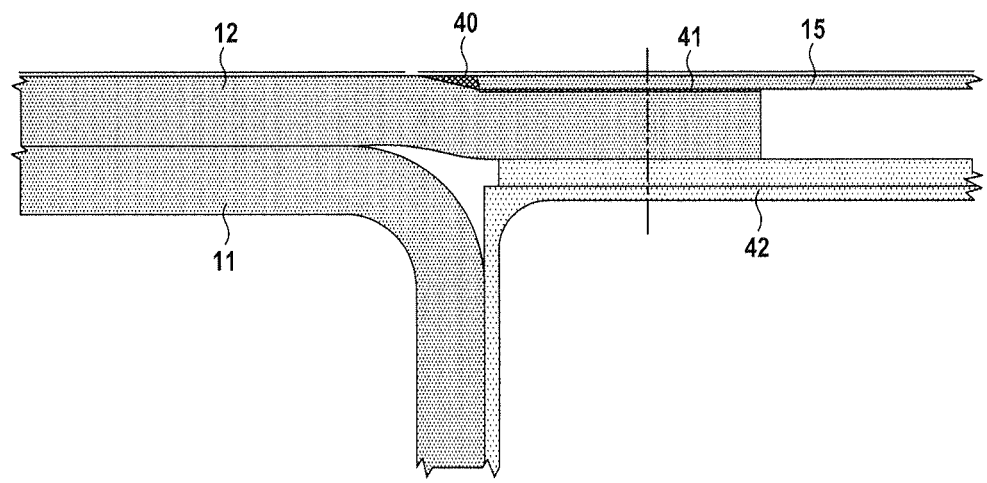
FIG. 8 is a side view of an alternative joint between a wing skin and leading-edge panel.
Figure 9:
FIG. 9 is a side view of the rubber edge protector by itself.

FIGS. 8 and 9 illustrate an alternative form of edge protector. Most elements of the structure are the same as in FIG. 5, and the same reference numerals are used for equivalent elements. In this case the edge protector is made of pre-formed rubber and forms a seal between the skin 12 and the panel 15. The edge protector has a tapered wedge shaped portion 40 which covers the ramp, and a tail 41 shown most clearly in FIG. 9 which forms a seal between the overlapping parts. The edge protector in this case may be attached to the panel 15 or to the skin 12 by a layer of adhesive (not shown) before they are overlapped to form the joint. A rib 42 is also shown in FIG. 8, and the skin 12 and panel 15 are bolted to the rib 42.

Preferably the rubber edge protector is pre-attached to the panel 15 instead of the skin 12. This creates a replaceable item if damaged or worn, with no impact on the primary structure.

Figure 10:
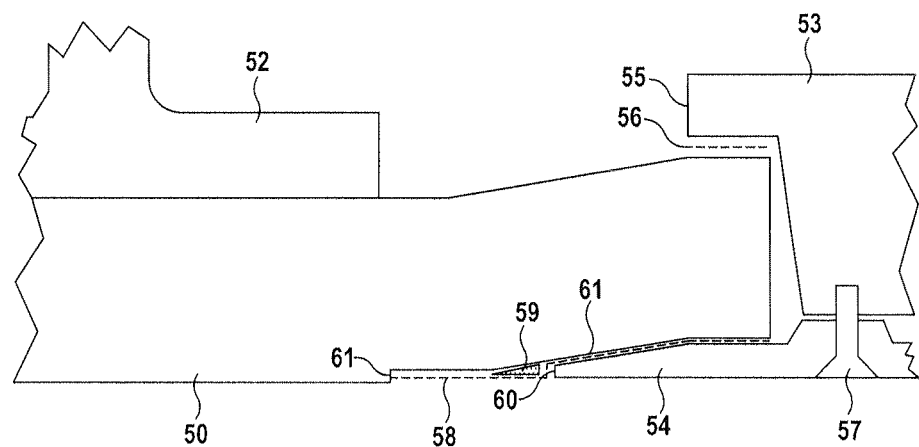
FIG. 10 is a sectional view showing a joggle joint between a wing skin and a manhole cover.

FIG. 10 shows a joggle joint between a laminar composite skin 50 and a manhole cover 54. The composite skin 50 is a bottom skin of an aircraft wing and carries a series of T-section stringers on its inner surface, part of one of such stringers 52 being shown in cross-section.

The manhole cover 54 is clamped to the skin 50 by a clamping plate 53. The manhole cover 54 and clamping plate 53 are both approximately oval when viewed from below the aircraft wing. The skin 50 is formed with an oval opening which receives the clamping plate 53. The clamping plate 53 has an annular flange 55 which engages the inner surface of the skin 50. A rubber sealing gasket 56, shown in dashed line, provides a fuel-tight seal between the flange 55 and the skin 50.

The manhole cover 54 is joined to the clamping plate 53 around its periphery by a series of fasteners 57. As the fasteners 57 are tightened they clamp the skin 50 between the two parts 53,54. A rubber sealing gasket 58, shown in dashed line, provides a fuel-tight seal between the manhole cover 54 and the skin 50. A tapered filler 59 is provided between the gasket 58 and the skin 50.

The skin 50 is formed with a joggled stack of layers in a similar manner to the skin 12 as shown in FIG. 6. The clamping plate 53 and fasteners 57 together act as a clamp which holds the parts 50,54 together where they overlap. The fasteners 57 can be removed to enable the joint to be disassembled and provide access to the interior of the wing. The skin 50 and manhole cover 54 have external sides which are substantially aligned with each other so as to form a smooth aerodynamic surface.

In contrast with the previous embodiments in which the leading edge panel 15 has a constant thickness, the thickness of the manhole cover 54 tapers towards a relatively narrow edge 60, the taper following the angle of the ramp 61 in the joggle. The external side of the skin 50 is formed with an annular recess with a step 61 which accommodates the gasket 58 so that the gasket 58 lies flush with the external sides of the skin 50 and the manhole cover 54.

The gasket 58 and tapered filler 59 together act as an edge protector, protecting the edge 60 of the manhole cover 54, and the skin 50, from erosion by particles carried by the airflow.

Although the invention has been described above with reference to one or more preferred embodiments, it will be appreciated that various changes or modifications may be made without departing from the scope of the invention as defined in the appended claims.

The invention claimed is:

1. A method of manufacturing an aircraft joint between a laminar composite cover and a second cover, the method comprising:
 providing said laminar composite cover comprising a stack of layers, substantially all of the layers being shaped to form a joggle, each joggle comprising
  a first portion having a plurality of said layers,
  a second portion having a plurality of said layers where the second portion layers extend substantially parallel with the first portion layers, and
  a ramp having a plurality of layers located between the first and second portions where the plurality of layers extend at an angle to the first and second portions, the number of layers in said first and second portions are substantially the same on both sides of the ramp;
 partially overlapping said second cover with said composite cover;
 holding the covers together where they overlap with a clamp or fastener;
 substantially aligning external sides of the covers with each other so as to form a smooth aerodynamic surface;
 pre-forming a protector with a tapered shape; and
 attaching said pre-formed protector to one of the covers before the covers are overlapped, wherein said protector and said external sides of said covers form a substantially continuous external aerodynamic surface.

2. The method of claim 1 wherein the protector is cocured with the composite cover.

3. The method of claim 1 further comprising preforming the protector by pulling or extruding material through a die with a desired crosssectional shape.

4. A method of manufacturing a composite cover, the method comprising:
 pre-forming a protector with a tapered shape, wherein the protector tapers gradually from a thick end to a thin edge;
 mounting the protector on a mold tool such that the thick end of the protector is positioned adjacent to a step on a mold surface of the mold tool, the mold surface having a first portion adjoining a top of the step and a second portion adjoining a bottom of the step;
 laying a stack of layers of composite material on the protector on the mold tool whereby at least one of the layers forms a ramp, the composite cover having an outer mold line and the outer mold line engaging the first portion of the mold surface, the protector and the second portion of the mold surface; and
 curing the stack of layers of composite material.

5. The method of claim 4, wherein the protector is co-cured with the stack of layers of composite material.

6. The method of claim 4 further comprising at least partially curing the protector before it is mounted on the mold tool.

7. The method of claim 4 wherein the protector is preformed by pulling or extruding material through a die with a tapered cross-sectional shape.

8. The method of claim 4 wherein substantially all of the layers are shaped to form a joggle, each joggle comprising:
 a first portion,
 a second portion where the layer extends substantially parallel with the first portion,
 the ramp is between the first and second portions where the ramp extends at an angle to the first and second portions, and
 the number of layers being substantially the same on both sides of the ramp.

9. A method to manufacture a cover formed of layers of a composite material, the method comprising:
 pre-forming a protector strip having a tapered cross-sectional shape, wherein one edge of the protector strip is thick and an opposite edge of the protector is thin;
 positioning the protector strip on a mold surface such that the thick edge of the protector is adjacent a step in the surface and the thin edge is adjacent a flat region of the mold surface, the mold surface having a first portion adjoining a top of the step and a second portion adjoining a bottom of the step;
 laying the layers of composite material over the positioned protector strip and over the mold surface to form a stack of layers, wherein the stack of layers includes a ramp aligned with the protector strip, the composite cover having an outer mold line and the outer mold line engaging the first portion of the mold surface, the protector and the second portion of the mold surface, and
 curing the stack of layers of composite material.

\* \* \* \* \*